United States Patent
Rice et al.

(10) Patent No.: US 10,947,929 B2
(45) Date of Patent: Mar. 16, 2021

(54) INTEGRATED AIRCRAFT PROPULSION SYSTEM

(71) Applicant: ROLLS ROYCE NORTH AMERICAN TECHNOLOGIES INC., Indianapolis, IN (US)

(72) Inventors: Edward C. Rice, Indianapolis, IN (US); Richard K. Keller, Indianapolis, IN (US); William B. Bryan, Indianapolis, IN (US)

(73) Assignee: ROLLS-ROYCE NORTH AMERICAN TECHNOLOGIES INC., Indianapolis, IN (US)

( * ) Notice: Subject to any disclaimer, the term of this patent is extended or adjusted under 35 U.S.C. 154(b) by 269 days.

(21) Appl. No.: 16/017,647

(22) Filed: Jun. 25, 2018

(65) Prior Publication Data
US 2018/0306143 A1    Oct. 25, 2018

Related U.S. Application Data

(62) Division of application No. 14/837,079, filed on Aug. 27, 2015, now abandoned.

(51) Int. Cl.
*F02K 3/12*       (2006.01)
*B64D 27/20*  (2006.01)

(52) U.S. Cl.
CPC ............... *F02K 3/12* (2013.01); *B64D 27/20* (2013.01); *Y02T 50/40* (2013.01)

(58) Field of Classification Search
CPC ..... F02K 3/12; F02C 6/02; F02C 7/36; B64D 27/14
See application file for complete search history.

(56) References Cited

U.S. PATENT DOCUMENTS

| | | |
|---|---|---|
| 2,601,194 A | 6/1952 | Whittle |
| 2,929,207 A | 3/1960 | Peterson |
| 3,025,025 A | 3/1962 | Düttmann |
| 3,442,493 A | 5/1969 | Smith, Jr. |
| 3,517,509 A | 6/1970 | Bayati |
| 3,659,422 A | 5/1972 | Hope |
| 3,739,580 A | 6/1973 | Bland et al. |
| 3,861,822 A | 1/1975 | Wanger |
| 3,946,554 A | 3/1976 | Neumann |
| 4,000,868 A | 1/1977 | Gregor |
| 4,089,493 A | 5/1978 | Paulson |
| 4,149,374 A | 4/1979 | Barchenko |
| 4,235,397 A | 11/1980 | Compton |

(Continued)

OTHER PUBLICATIONS

Requirement for Restriction/Election, issued in U.S. Appl. No. 14/837,079, dated Nov. 7, 2016, pp. 1-9, U.S. Patent and Trademark Office, Alexandria, VA.

(Continued)

*Primary Examiner* — Joseph W Sanderson
(74) *Attorney, Agent, or Firm* — Brinks Gilson & Lione

(57) ABSTRACT

An integrated propulsion system comprising at least two gas turbine engines, at least one fan, and a transmission assembly coupling the at least two gas turbine engines to the at least one fan wherein the at least two gas turbine engines are disposed within a main body of an airframe comprising the main body and a pair of wings, and wherein the number of gas turbine engines is greater than the number of fans.

15 Claims, 12 Drawing Sheets

(56) References Cited

U.S. PATENT DOCUMENTS

| | | |
|---|---|---|
| 4,254,619 A | 3/1981 | Giffin, III et al. |
| 4,705,452 A | 11/1987 | Karadimas |
| 4,791,783 A | 12/1988 | Neitzel |
| 4,912,924 A | 4/1990 | Stockwell |
| 5,180,119 A | 1/1993 | Picard |
| 5,314,301 A | 5/1994 | Knight |
| 5,464,175 A * | 11/1995 | Short ................. F01D 5/148 |
| | | 239/265.19 |
| 5,472,314 A | 12/1995 | Delonge et al. |
| 5,518,363 A | 5/1996 | Theis |
| 5,520,511 A | 5/1996 | Loudet et al. |
| 5,855,340 A | 1/1999 | Bacon |
| 5,911,679 A | 6/1999 | Farrell et al. |
| 5,947,412 A | 9/1999 | Berman |
| 6,279,852 B1 * | 8/2001 | Dusserre-Telmon ................. |
| | | B64D 27/14 |
| | | 244/60 |
| 6,379,110 B1 | 4/2002 | McCormick et al. |
| 6,415,597 B1 | 7/2002 | Futamura et al. |
| 6,688,552 B2 | 2/2004 | Franchet et al. |
| 6,792,746 B2 | 9/2004 | Saito et al. |
| 6,834,495 B2 | 12/2004 | Saito et al. |
| 6,845,606 B2 | 6/2005 | Franchet et al. |
| 7,033,132 B2 | 4/2006 | Gharib |
| 7,059,129 B2 | 6/2006 | Zollinger et al. |
| 7,114,911 B2 | 10/2006 | Martin et al. |
| 7,134,631 B2 | 11/2006 | Loth |
| 7,140,188 B2 | 11/2006 | Hosokawa et al. |
| 7,444,802 B2 | 11/2008 | Parry |
| 7,464,533 B2 | 12/2008 | Wollenweber |
| 7,491,030 B1 | 2/2009 | Pinera et al. |
| 7,549,839 B2 | 6/2009 | Carroll et al. |
| 7,631,483 B2 | 12/2009 | Mani et al. |
| 7,665,689 B2 | 2/2010 | McComb |
| 7,669,404 B2 | 3/2010 | Samimy et al. |
| 7,828,516 B2 | 11/2010 | Hartmann et al. |
| 7,837,436 B2 | 11/2010 | Corsmeier et al. |
| 7,877,980 B2 | 2/2011 | Johnson |
| 7,887,287 B2 | 2/2011 | Yanagi et al. |
| 8,011,882 B2 | 9/2011 | McMillan |
| 8,152,095 B2 | 4/2012 | Cazals et al. |
| 8,161,728 B2 | 4/2012 | Kupratis |
| 8,336,289 B2 | 12/2012 | Roberge |
| 8,393,857 B2 | 3/2013 | Copeland et al. |
| 8,468,795 B2 | 6/2013 | Suciu et al. |
| 8,529,188 B2 | 9/2013 | Winter |
| 8,562,284 B2 | 10/2013 | Bradbrook |
| 8,578,700 B2 | 11/2013 | Khakhar |
| 8,657,561 B2 | 2/2014 | Buffone et al. |
| 8,770,921 B2 | 7/2014 | Huber et al. |
| 8,813,907 B2 | 8/2014 | Tanaka et al. |
| 8,862,362 B2 | 10/2014 | Teicholz et al. |
| 8,915,703 B2 | 12/2014 | Mohammed |
| 9,003,768 B2 | 4/2015 | Suciu et al. |
| 9,016,041 B2 | 4/2015 | Baughman et al. |
| 9,017,038 B2 | 4/2015 | Pelley et al. |
| 9,239,011 B2 * | 1/2016 | Jones ................. F02C 7/275 |
| 9,297,270 B2 | 3/2016 | Suciu et al. |
| 9,540,113 B2 * | 1/2017 | Gukeisen ................. F02K 1/60 |
| 9,701,395 B2 * | 7/2017 | Veilleux, Jr. ............ B64D 35/06 |
| 10,435,163 B2 * | 10/2019 | Gallet ................. B64D 27/14 |
| 2002/0190158 A1 | 12/2002 | Franchet et al. |
| 2003/0146344 A1 * | 8/2003 | Saito ................. F02C 6/08 |
| | | 244/55 |
| 2006/0011780 A1 * | 1/2006 | Brand ................. B64D 35/04 |
| | | 244/60 |
| 2008/0131268 A1 | 6/2008 | Guemmer |
| 2010/0166543 A1 | 7/2010 | Carroll |
| 2010/0329844 A1 * | 12/2010 | Bradbrook ................. F02K 3/04 |
| | | 415/61 |
| 2011/0146289 A1 | 6/2011 | Baughman |
| 2011/0167791 A1 | 7/2011 | Johnson et al. |
| 2011/0167792 A1 | 7/2011 | Johnson et al. |
| 2011/0167831 A1 | 7/2011 | Johnson |
| 2011/0176913 A1 | 7/2011 | Wassynger et al. |
| 2011/0252808 A1 | 10/2011 | McKenney et al. |
| 2013/0019608 A1 * | 1/2013 | Jones ................. F02C 9/42 |
| | | 60/779 |
| 2013/0223991 A1 | 8/2013 | Suciu et al. |
| 2013/0323013 A1 | 12/2013 | Mercier et al. |
| 2014/0090388 A1 | 4/2014 | Hasel |
| 2014/0252161 A1 * | 9/2014 | Gukeisen ................. F02K 3/068 |
| | | 244/60 |
| 2014/0260180 A1 | 9/2014 | Kupratis et al. |
| 2014/0345253 A1 | 11/2014 | Dawson et al. |
| 2015/0102156 A1 | 4/2015 | Devenyi |
| 2015/0121838 A1 | 5/2015 | Suciu et al. |
| 2015/0233302 A1 | 8/2015 | Levasseur et al. |
| 2015/0291285 A1 * | 10/2015 | Gallet ................. B64D 27/20 |
| | | 415/60 |
| 2017/0057649 A1 * | 3/2017 | Rice ................. B64D 27/20 |
| 2018/0281979 A1 * | 10/2018 | Reigner ................. B64D 35/06 |
| 2019/0382123 A1 * | 12/2019 | Schwarz ................. B64D 27/02 |

OTHER PUBLICATIONS

Non-Final Office Action, issued in U.S. Appl. No. 14/837,079, dated May 12, 2017, pp. 1-10, U.S. Patent and Trademark Office, Alexandria, VA.

Final Office Action, issued in U.S. Appl. No. 14/837,079, dated Sep. 7, 2017, pp. 1-10, U.S. Patent and Trademark Office, Alexandria, VA.

Non-Final Office Action, issued in U.S. Appl. No. 14/837,079, dated Dec. 11, 2017, pp. 1-8, U.S. Patent and Trademark Office, Alexandria, VA.

* cited by examiner

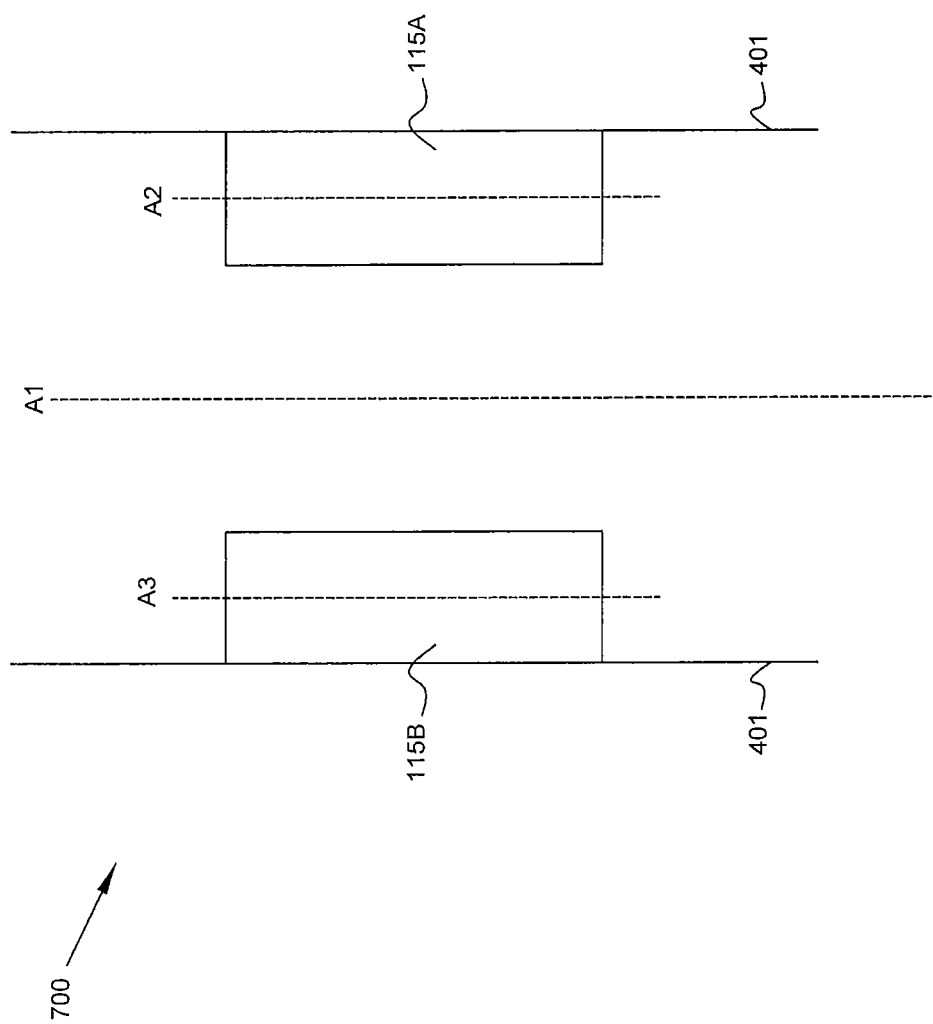

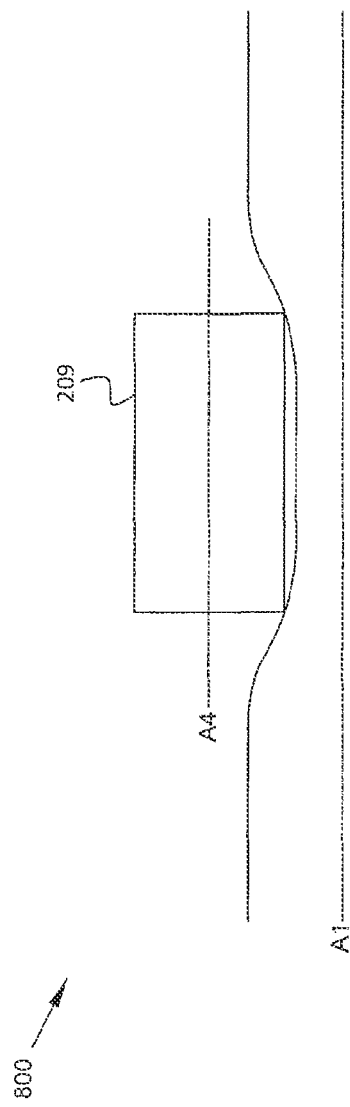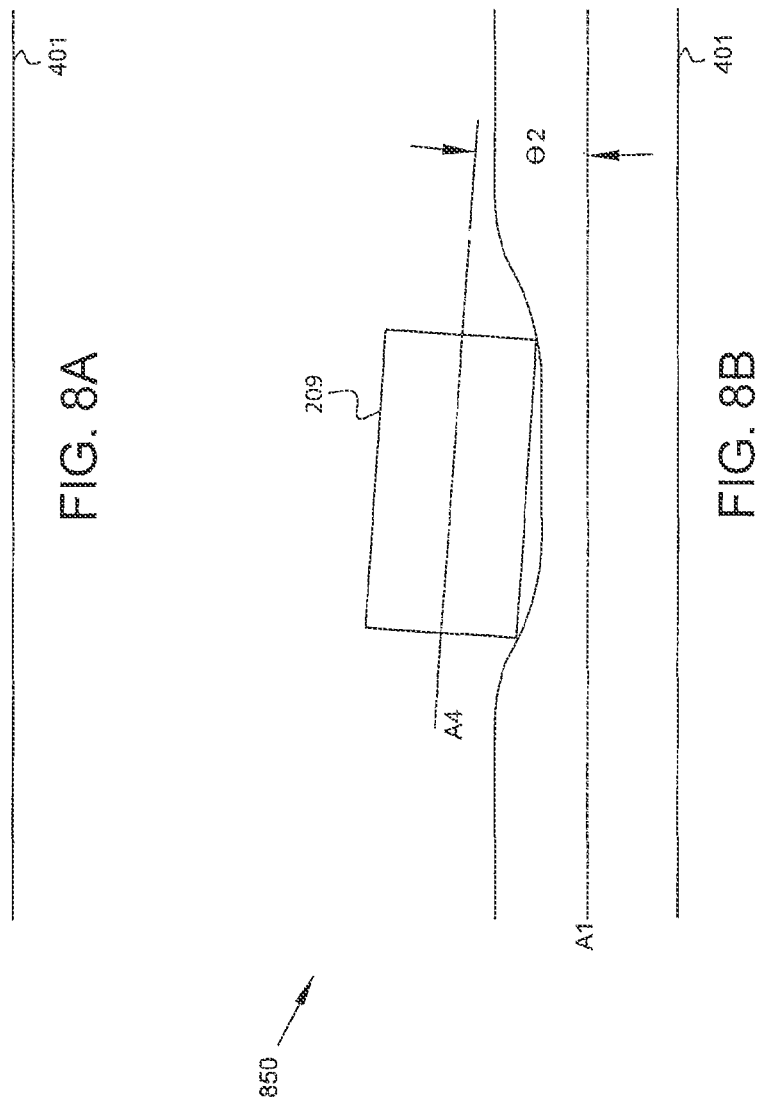

INTEGRATED AIRCRAFT PROPULSION SYSTEM

RELATED APPLICATIONS

This application is a divisional of U.S. patent application Ser. No. 14/837,079, filed 27 Aug. 2015, first named inventor: Edward C. Rice, and is related to applications U.S. patent application Ser. No. 14/837,190, filed 27 Aug. 2015, first named inventor: Edward C. Rice; U.S. patent application Ser. No. 14/837,302, filed 27 Aug. 2015, first named inventor: Edward C. Rice; U.S. patent application Ser. No. 14/837,557, filed 27 Aug. 2015, first named inventor: Edward C. Rice; U.S. patent application Ser. No. 14/837,942, filed on 27 Aug. 2015, first named inventor: Edward C. Rice; U.S. patent application Ser. No. 14/837,987, filed 27 Aug. 2015, first named inventor: Edward C. Rice; U.S. patent application Ser. No. 14/837,031, filed 27 Aug. 2015, first named inventor: William Barry Bryan; U.S. patent application Ser. No. 14/838,027, filed 27 Aug. 2015, first named inventor: Edward C. Rice; and U.S. patent application Ser. No. 14/838,067, filed 27 Aug. 2015, first named inventor: Edward C. Rice. The entirety of each of these prior applications are hereby incorporated by reference.

FIELD OF THE DISCLOSURE

The present disclosure relates generally to aircraft propulsion, and more specifically to integrated propulsion systems for aircraft comprising gas turbine engines and fans.

BACKGROUND

Turbofan engines provide propulsion to a wide range of aircraft. A typical turbofan engine comprises an inlet fan, a compressor fan, a combustor, a high-pressure turbine, and a low-pressure turbine. Some air which passes through the inlet fan bypasses the compressor fan, combustor, and high- and low-pressure turbines.

In some applications, conventional turbofan engines are too costly in terms of volume, weight, and packaging or placement within an airframe. Due to the numerous performance requirements and applications of modern aircraft, more efficient propulsion systems are in demand which require less volume, weigh less, and/or provide greater packaging and placement options within an airframe.

The present application discloses one or more of the features recited in the appended claims and/or the following features which, alone or in any combination, may comprise patentable subject matter.

According to an aspect of the present disclosure, an integrated propulsion system comprises at least two gas turbine engines, at least one fan, and a transmission assembly coupling the at least two gas turbine engines to the at least one fan wherein the at least two gas turbine engines are disposed within a main body of an airframe comprising the main body and a pair of wings, and wherein the number of gas turbine engines is greater than the number of fans. In some embodiments each of the gas turbine engines having an exclusive engine air flow duct comprising an engine inlet and an engine exhaust. In some embodiments the fan has an exclusive fan air flow duct comprising a fan inlet and a fan exhaust. In some embodiments the fan exhaust comprises a fan exhaust duct and a thrust vectoring mechanism. In some embodiments each of the engine inlet and the fan inlet comprise an inlet duct extending radially outward from the main body of the airframe. In some embodiments the at least one fan is mounted within the main body of the airframe. In some embodiments the transmission assembly comprises a clutch mechanism. In some embodiments the output power of the at least two gas turbine engines is distributed to the at least one fan when the clutch mechanism is engaged. In some embodiments the fan has a fan exhaust duct and each of the gas turbine engines having an engine inlet duct connected to the fan exhaust duct.

According to another aspect of the present disclosure, an integrated propulsion system consists of a first gas turbine engine and a second gas turbine engine, a fan, and a transmission assembly coupling the first gas turbine engine and the second gas turbine engine to the fan. In some embodiments the first gas turbine engine, the second gas turbine engine, and the fan each have an exclusive air flow duct. In some embodiments the air flow duct of the fan comprises an inlet duct, exhaust duct, and thrust vectoring mechanism. In some embodiments of the first gas turbine engine, the second gas turbine engine, and the fan have an axis of rotation which is parallel to a central axis of a main body of an airframe. In some embodiments the first gas turbine engine and the second gas turbine engine an axis of rotation which is disposed at an angle to a central axis of a main body of an airframe. In some embodiments the fan has an axis of rotation normal to a central axis of a main body of an airframe. In some embodiments the transmission assembly comprises a gearbox. In some embodiments the transmission assembly comprises a clutch.

According to another aspect of the present disclosure, an integrated propulsion system comprises a first gas turbine engine and a second gas turbine engine, each of the first gas turbine engine and the second gas turbine engine mounted within an airframe and having an exclusive air flow duct comprising an engine inlet duct and an engine exhaust duct; a fan mounted to the airframe and having an exclusive air flow duct comprising a fan inlet duct and a fan exhaust duct; and a transmission assembly coupling the first gas turbine engine and the second gas turbine engine to the fan; wherein the airframe comprises a main body and a pair of laminar flow wings and wherein the transmission assembly distributes power from the first gas turbine engine and the second gas turbine engine to the fan and a second load. In some embodiments the second load is one of a lift rotor, a propeller, or a generator. In some embodiments the fan exhaust duct comprises a thrust vectoring mechanism.

According to yet another aspect of the present disclosure, a method is provided of reducing drag in a turbofan aircraft. The method comprises reducing the required cross-sectional area of an aircraft body and reducing the total weight of the aircraft propulsion system by: disposing a first gas turbine engine on a first side of the aircraft body and a second gas turbine engine on a second side of the aircraft body; disposing a fan unit on the aircraft body, the fan unit coupled to the first gas turbine engine and the second gas turbine engine by a transmission assembly comprising a clutch and more than one rotating linkages; venting each of the first gas turbine engine and the second gas turbine engine via a respective exclusive engine duct comprising an engine inlet duct and an engine exhaust duct; and venting the fan unit via an exclusive fan duct comprising a fan inlet duct and a fan exhaust duct. In some embodiments the fan exhaust duct includes a thrust vectoring mechanism. In some embodiments each of the first gas turbine engine, the second gas turbine engine, and the fan unit have an axis of rotation which is parallel to a central axis of a main body of an airframe.

BRIEF DESCRIPTION OF THE DRAWINGS

The following will be apparent from elements of the figures, which are provided for illustrative purposes and are not necessarily to scale.

FIG. 7A is a top cross-sectional view of the main body in accordance with some embodiments of the present disclosure.

FIG. 8A is a side cross-sectional view of the main body in accordance with some embodiments of the present disclosure.

FIG. 8B is a side cross-sectional view of the main body in accordance with some embodiments of the present disclosure.

Figure 1:
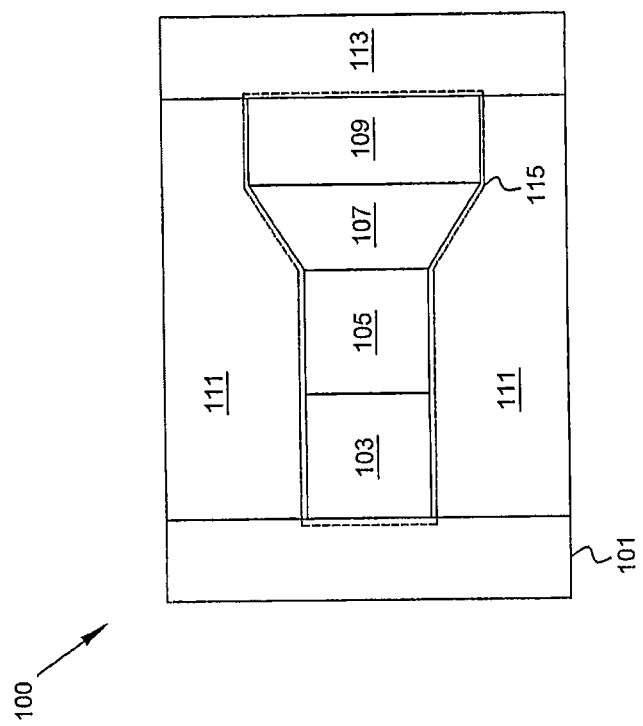
FIG. 1 is a block schematic diagram of a typical turbofan engine.

While the present disclosure is susceptible to various modifications and alternative forms, specific embodiments have been shown by way of example in the drawings and will be described in detail herein. It should be understood, however, that the present disclosure is not intended to be limited to the particular forms disclosed. Rather, the present disclosure is to cover all modifications, equivalents, and alternatives falling within the spirit and scope of the disclosure as defined by the appended claims.

DETAILED DESCRIPTION

For the purposes of promoting an understanding of the principles of the disclosure, reference will now be made to a number of illustrative embodiments illustrated in the drawings and specific language will be used to describe the same.

This disclosure presents embodiments to overcome the aforementioned deficiencies of conventional turbofan engines. More specifically, this disclosure is directed to an integrated propulsion system having a smaller volume, lighter weight, and greater range of placement options within an airframe when compared to conventional turbofan engines. The integrated propulsion system comprises gas turbine engines and at least one fan linked by a transmission assembly.

FIG. 1 is a block schematic diagram of a typical turbofan engine 100. The turbofan engine 100 comprises an inlet fan 101, a compressor 103, a combustor 105, a high-pressure turbine 107, a low-pressure turbine 109, a bypass region 111, and an exhaust mixing region 113. The inlet fan 101 is mounted to the front of the compressor 103. The engine core 115 is defined as the compressor 103, combustor 105, high-pressure turbine 107, and low-pressure turbine 109.

Air enters the turbofan engine 100 via inlet fan 101. A first portion of the air flows through the bypass region 111 and into the exhaust mixing region 113. A second portion of the air flows into the compressor 103 where it is pressurized, then into the combustor where it is mixed with fuel and ignited. The ratio of the first portion of air flowing through the bypass region 111 to the second portion of air flowing through the engine core 115 is referred to as the bypass ratio.

The hot, high-pressure combustion gasses are directed sequentially into the high-pressure turbine 107 and low-pressure turbine 109, causing each turbine 107, 109 to rotate about a shaft which is connected to and drives the compressor 103 and the inlet fan 101. In multiple-spool designs, more than one concentric shafts are used to separately rotate various components. For example, in a standard two-spool turbofan engine the high-pressure turbine 107 and compressor 103 are connected using a first common shaft while the low-pressure turbine 109 and inlet fan 101 are connected using a second common shaft.

In the turbofan engine 100 presented in FIG. 1, a first portion of thrust is created by the engine 100 is created by the inlet fan 101 sending airflow through the bypass region 111, while a second portion of thrust is created by the exhaust of the engine core 115.

Figure 2:
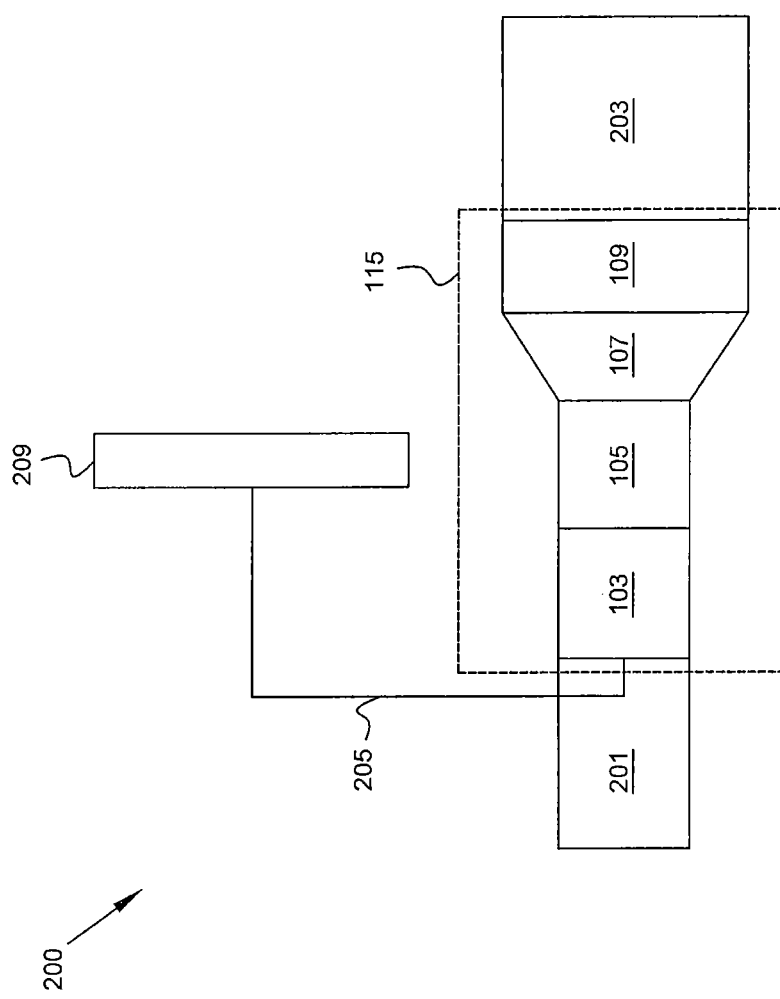
FIG. 2 is a block schematic diagram of a turbofan engine in which a fan is physically separated from the engine core and linked via transmission mechanism in accordance with some embodiments of the present disclosure.
Figure 4:
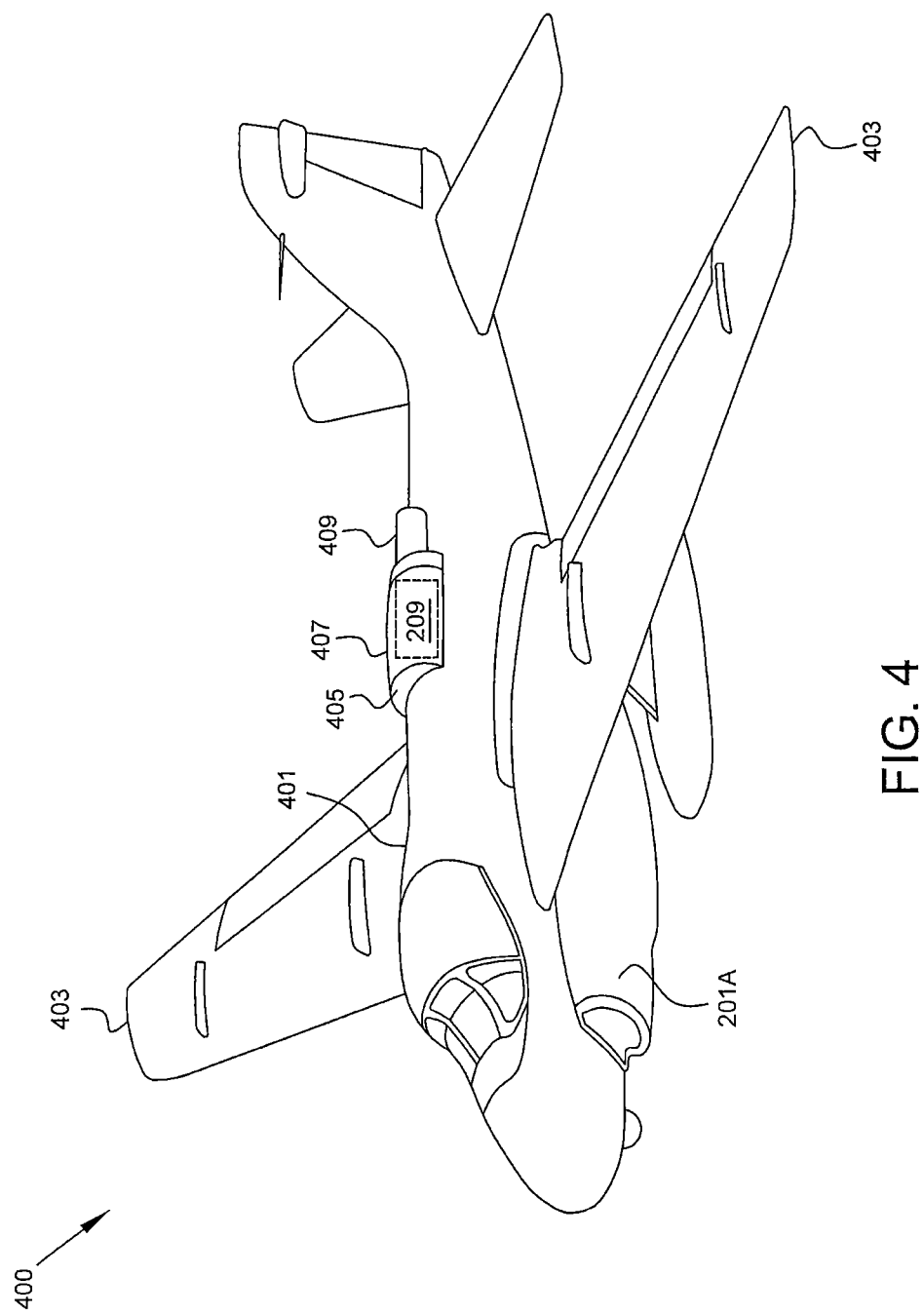
FIG. 4 is an isometric view of an aircraft having integrated propulsion system in accordance with some embodiments of the present disclosure.
Figure 5:
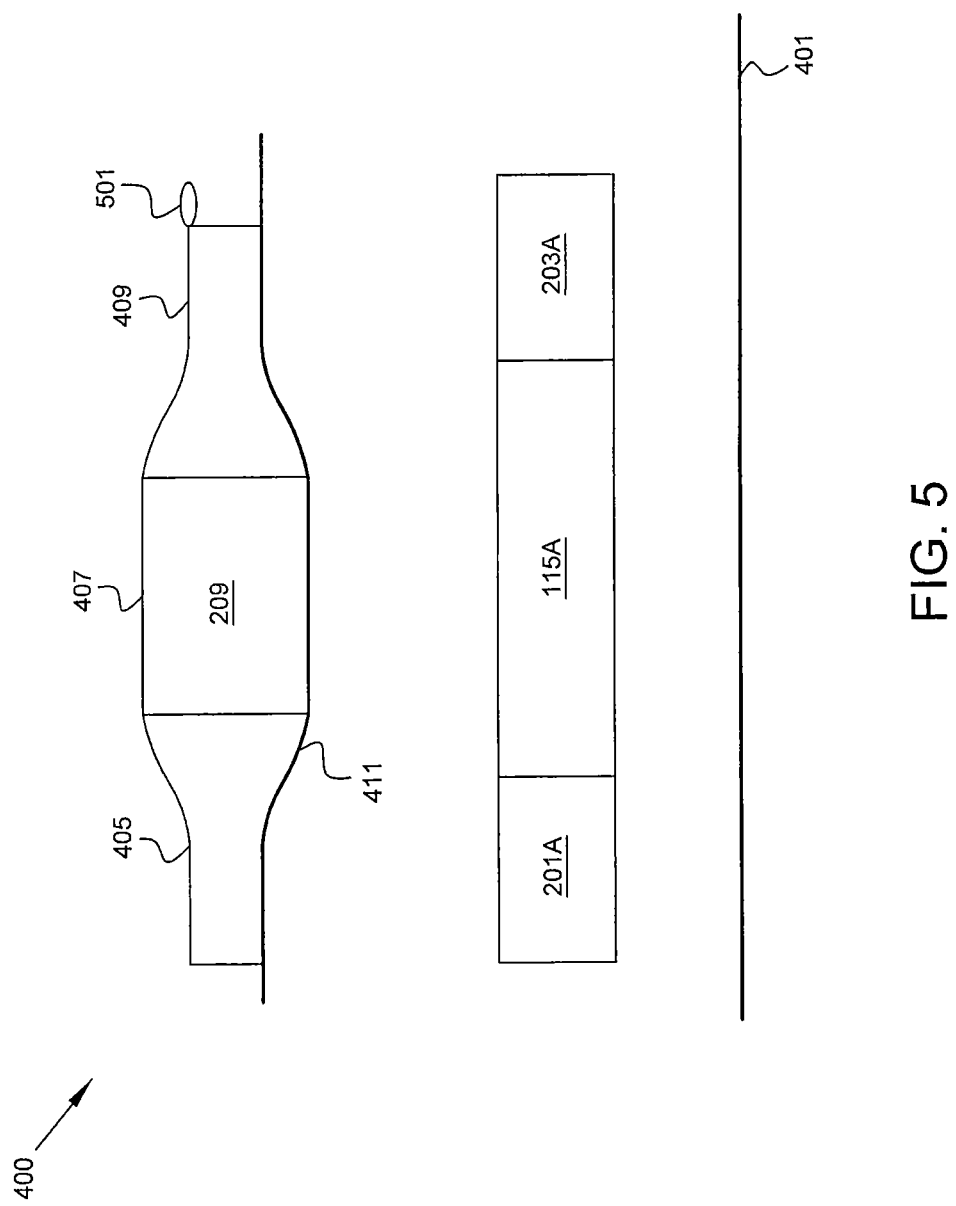
FIG. 5 is a side profile view of the main body of an aircraft in accordance with some embodiments of the present disclosure.

FIG. 2 is a block schematic diagram of a turbofan engine 200 in which a fan 209 is physically separated from the engine core 115 yet linked via transmission mechanism 205. An engine inlet duct 201 and engine exhaust duct 203 are connected on either side of the engine core 115. In some embodiments, fan 209 receives inlet airflow with the engine inlet duct 201. In some embodiments, fan 209 sends exhaust airflow to the engine exhaust duct 203. However, in other embodiments such as illustrated in FIGS. 4, 5, and 6 and described below, fan 209 is connected to a fan inlet duct 405 and fan exhaust duct 409 which are distinct from the engine inlet duct 201 and engine exhaust duct 203.

Transmission mechanism 205 transferred shaft power from engine core 115 to fan 209. In some embodiments, transmission mechanism 205 includes a clutch mechanism, a gearbox, a beveled gear, and/or an angled gearbox. In those embodiments in which transmission mechanism 205 comprises a clutch mechanism, output power of the first engine core 115A and second engine core 115B is distributed to the fan when the clutch mechanism is engaged.

Figure 3A:
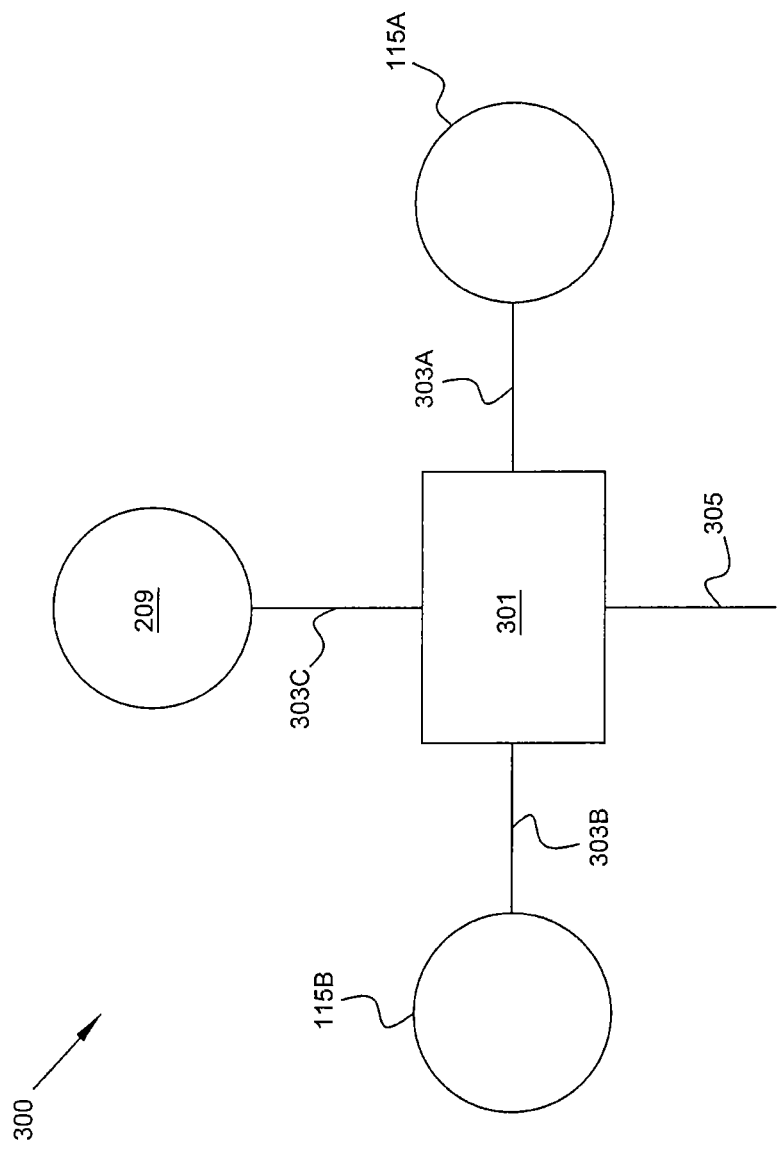
FIG. 3A is a block diagram of an integrated propulsion system in accordance with some embodiments of the present disclosure.

FIG. 3A is a block diagram of an integrated propulsion system 300 comprising a fan 209 connected to a first engine core 115A and second engine core 115B via at least one transmission shaft 303 and a gearbox 301. In some embodiments, an additional transmission shaft 305 is output from gearbox 301 to drive an alternative means of propulsion.

Figure 3B:
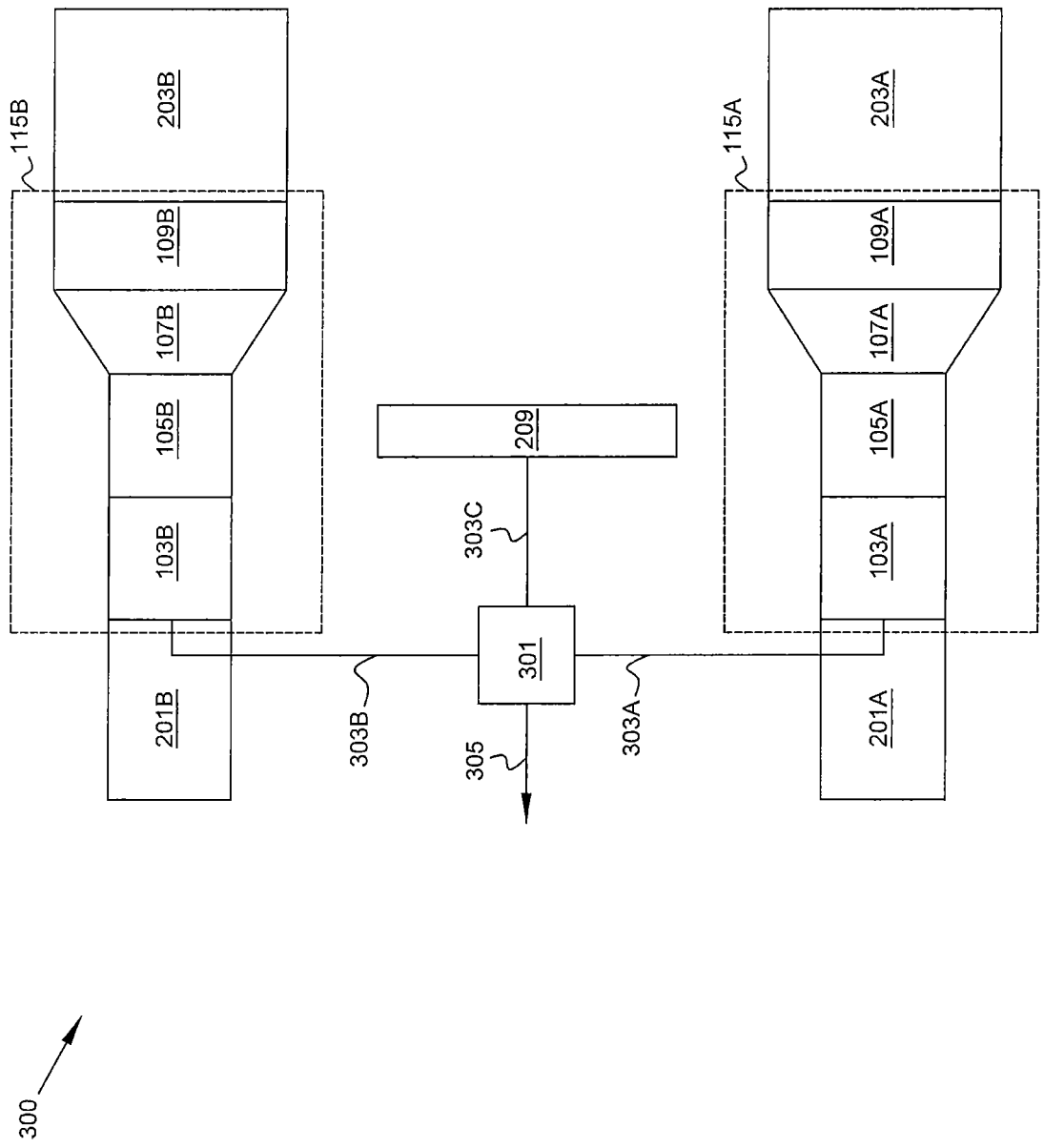
FIG. 3B is a detailed block diagram of the integrated propulsion system in FIG. 3A, in accordance with some embodiments of the present disclosure.

FIG. 3B provides a more detailed block schematic diagram of the integrated propulsion system 300. A first engine core 115A comprises a first compressor 103A, first combustor 105A, first high-pressure turbine 107A, and first low-pressure turbine 109A. First engine core 115A is connected to a first engine inlet duct 201A and first engine exhaust duct 203A. A second engine core 115B comprises a second compressor 103B, second combustor 105B, second high-pressure turbine 107B, and second low-pressure turbine 109B. Second engine core 115B is connected to a second engine inlet duct 201B and second engine exhaust duct 203B.

In some embodiments, as illustrated in FIG. 3B, each of first engine core 115A and second engine core 115B have an exclusive engine inlet duct (201A, 201B) and engine exhaust duct (203A, 203B). In other embodiments, one or both of the engine inlet ducts and engine exhaust ducts can be combined as a non-exclusive, shared duct. For example, first engine core 115A and second engine core 115B will in some embodiments share a common nonexclusive engine inlet duct while retaining separate engine exhaust ducts. Similarly, first engine core 115A and second engine core 115B will in some embodiments share a common nonexclusive engine inlet duct and share a common nonexclusive engine exhaust duct. Finally, in some embodiments first engine core 115A and second engine core 115B will share a common nonexclusive engine exhaust duct while retaining separate engine inlet ducts.

Fan 209 is supplied with shaft power from first engine core 115A and second engine core 115B via transmission shafts 303A, 303B, and 303C. In some embodiments, transmission shafts 303 pass through a gearbox 301. In some embodiments, gearbox 301 further comprises a clutch mechanism for selectively engaging transmission shaft 303A from first engine core 115A, transmission shaft 303B from second engine core 115B, or both. Transmission shaft 303C couples gearbox 301 to fan 209. In some embodiments an additional transmission shaft 305 is output from gearbox 301 to drive an alternative load, such as an alternative means of propulsion, a lift rotor, a propeller, or a generator.

As with the embodiment of FIG. 2 described above, in some embodiments, fan 209 receives inlet airflow from the first engine inlet duct 201A or second engine inlet duct 201B or a combination of the two. In some embodiments, fan 209 sends exhaust airflow to the first engine exhaust duct 203A or second engine exhaust duct 203B or a combination of the two. However, in other embodiments such as illustrated in FIGS. 4, 5, and 6 and described below, fan 209 is connected to a fan inlet duct 405 which is distinct from the first engine inlet duct 201A and second engine inlet duct 201B. Fan 209 is also connected to fan exhaust duct 409 which is distinct from first engine exhaust duct 203A and second engine exhaust duct 203B.

The integrated propulsion system 300 illustrated in FIGS. 3A and 3B is an improvement over a two turbofan engine configuration because using a single fan 209 requires less volume than using two fans, reduces overall system weight and drag, and tends to be more fuel efficient. In some embodiments, the single fan 209 is larger than a fan 101 mounted to a compressor 103 in a standard turbofan engine 100.

FIG. 4 is an isometric view of an aircraft 400 having integrated propulsion system 300. FIG. 4 illustrates a possible placement of the integrated propulsion system 300 on a conventional body aircraft 400. Specifically, aircraft 400 comprises a main body 401 of the airframe and a pair of laminar flow wings 403 extending from the main body 401. This conventional body aircraft 400 contrasts with alternative aircraft bodies such as a blended wing body or flying wing. The reduced volume of the integrated propulsion system 300 lends itself to smaller packaging and easier placement on a conventional body aircraft 400.

As illustrated in FIG. 4, fan 209 is contained within a fan shroud 407 and connected to a fan inlet duct 405 and fan exhaust duct 409 which are distinct from any engine ducting. A first engine inlet duct 201A is shown on the side of aircraft 400.

In the illustrated embodiment, the fan inlet duct 405, fan 209, and fan exhaust duct 409 are positioned on the main body 401 above the wings 403. In some embodiments, the fan inlet duct 405, fan 209, and fan exhaust duct 409 are positioned further forward or further aft than the illustrated position. In some embodiments, the fan inlet duct 405, fan 209, and fan exhaust duct 409 are more elongated than illustrated, resulting in fan ducting which covers a longer portion of aircraft 400. Finally, in some embodiments the fan inlet duct 405, fan 209, and fan exhaust duct 409 are positioned on the underside of main body 401.

Similarly, in the illustrated embodiment the first engine inlet duct 201A is positioned on the main body 401 beneath a wing 403. In some embodiments, the first engine inlet duct 201A and second engine inlet duct 201B (not shown in FIG. 4) are positioned further forward or further aft than the illustrated position. In some embodiments, engine inlet ducts 201A, 201B and engine exhaust ducts 203A, 203B are more elongated than illustrated, resulting in engine ducting which covers a longer portion of aircraft 400.

FIG. 5 is a side profile view of the main body 401 of the aircraft 400, illustrating the layout of a portion of the integrated propulsion system 300. As illustrated in FIG. 5, fan 209 is mounted within fan shroud 407 at the top of the main body 401 and connected to the fan inlet duct 405 and fan exhaust duct 409. In some embodiments fan 209 is disposed in a recess 411 in main body 401 to reduce aerodynamic drag. First engine core 115A is disposed inside main body 401 and connected to first engine inlet duct 201A and first engine exhaust duct 203A.

In some embodiments a thrust vectoring mechanism 501 is attached to the aft portion of fan exhaust duct 409. Thrust vectoring mechanism 501 can comprise articulating nozzles, vanes, or paddles.

As illustrated in FIG. 5, in some embodiments fan 209 is mounted above first engine core 115A. In some embodiments, fan 209 is mounted further forward or further aft relative to first engine core 115A. Similarly, in some embodiments first engine core 115A is mounted further forward or further aft relative to fan 209.

Figure 6B:
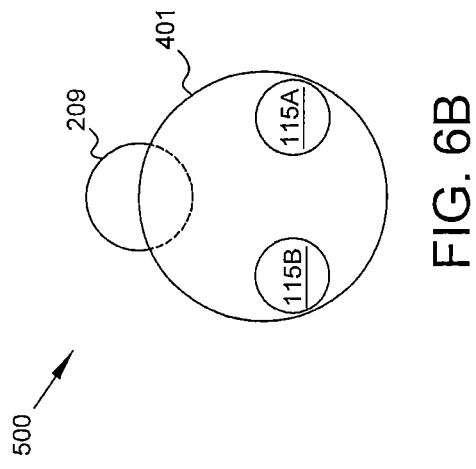
FIG. 6B is a radial cross-sectional view of the main body at the engines in accordance with some embodiments of the present disclosure.
Figure 6A:
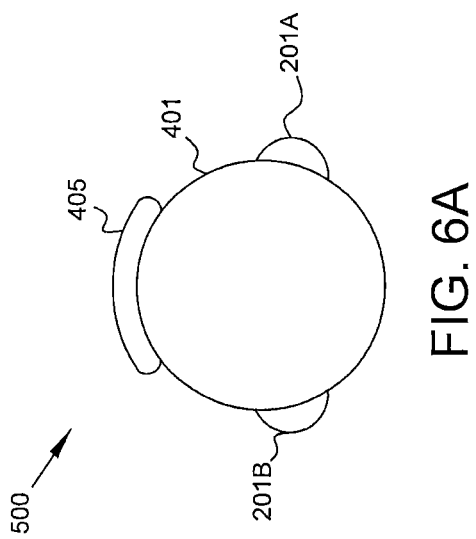
FIG. 6A is a radial cross-sectional view of the main body at the inlet ducts in accordance with some embodiments of the present disclosure.

FIG. 6A is a cross-sectional view of the main body 401 at the inlet ducts. A first engine inlet duct 201A, second engine inlet duct 201B, and fan inlet duct 405 are each mounted radially outward on the external main body 401 of an aircraft 400. As discussed above, in some embodiments fan inlet duct 405 is disposed at the top of main body 401; however, in other embodiments fan inlet duct 405 is disposed at the bottom of main body 401.

FIG. 6B is a cross-sectional view of the main body 401 at the engines and fan. FIG. 6B illustrates the first engine core 115A and second engine core 115B are disposed within main body 401 of aircraft 400. Fan 209 is disposed at the top of main body 401. In some embodiments, fan 209 is disposed in a recess 411 in main body 401 to reduce aerodynamic drag. As discussed above, in some embodiments fan 209 is disposed at the bottom of main body 401.

Figure 7B:
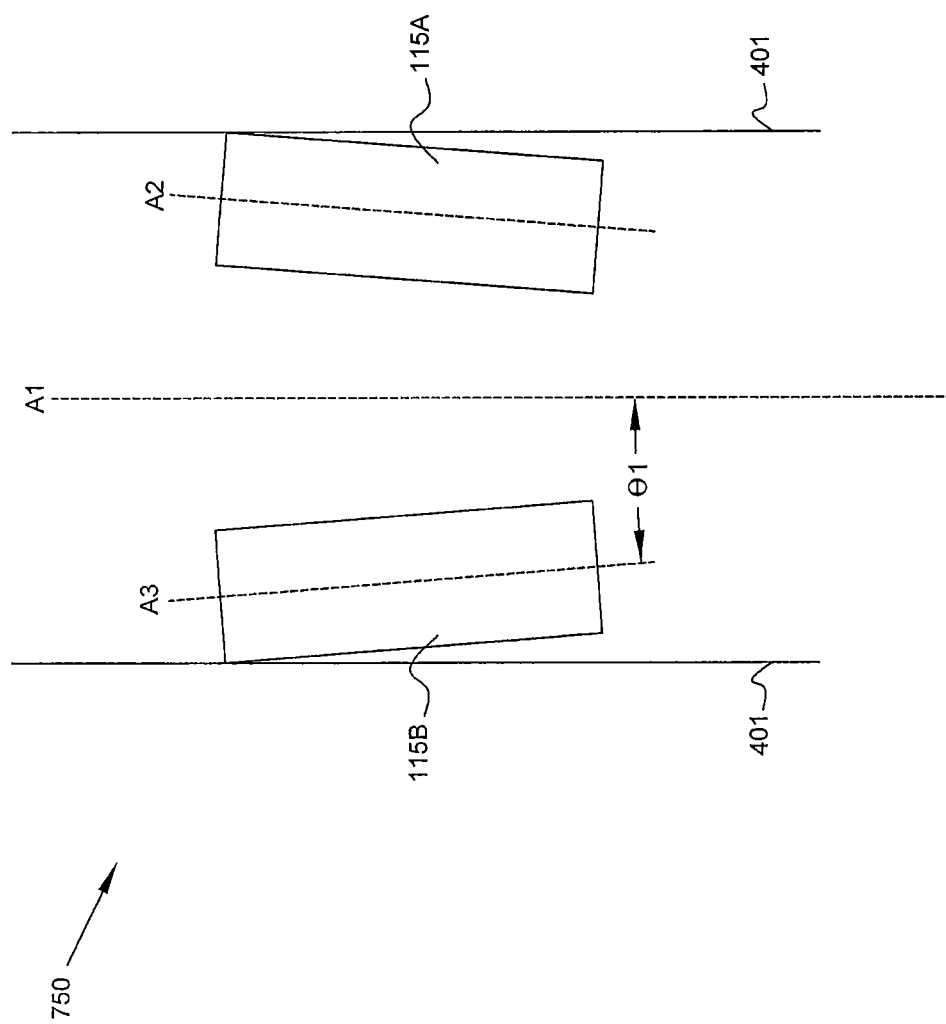
FIG. 7B is a top cross-sectional view of the main body in accordance with some embodiments of the present disclosure.

FIGS. 7A and 7B illustrate various embodiments regarding the placement of first engine core 115A and second engine core 115B. An airframe axis A1 extends through the center of main body 401, parallel with the length of the exterior of main body 401. In a first configuration 700, first engine core 115A and second engine core 115B are disposed within main body 401 such that a first engine core axis A2 and second engine core axis A3 are parallel to airframe axis A1. In a second configuration 750, first engine core 115A and second engine core 115B are disposed within main body 401 such that first engine core axis A2 and second engine core axis A3 are disposed at an angle θ1 to airframe axis A1.

In some embodiments first engine core axis A2 and second engine core axis A3 are defined as the axes of rotation for the respective gas turbine engine cores.

In some embodiments, first engine core 115A and second engine core 115B are disposed along a radial edge of main body 401. In other embodiments, first engine core 115A and second engine core 115B are disposed radially inward from the exterior skin of main body 401. In some embodiments, angle θ1 is between 5 and 25 degrees.

Similarly, FIGS. 8A and 8B illustrate various embodiments regarding the placement of fan 209. In a first configuration 800 illustrated in FIG. 8A, fan 209 has a fan axis A4 which is parallel to airframe axis A1. In a second configuration 850 illustrated in FIG. 8B, fan 209 has a fan axis A4 disposed at an angle θ2 to airframe axis A1. In some embodiments, angle θ2 is between 5 and 30 degrees. In other embodiments, angle θ2 is between 45 and 90 degrees. In other embodiments, fan axis A4 is normal to airframe axis A1. In still other embodiments, angle θ2 is variable based on a control system for controlling fan 209 angle.

Figure 9A:
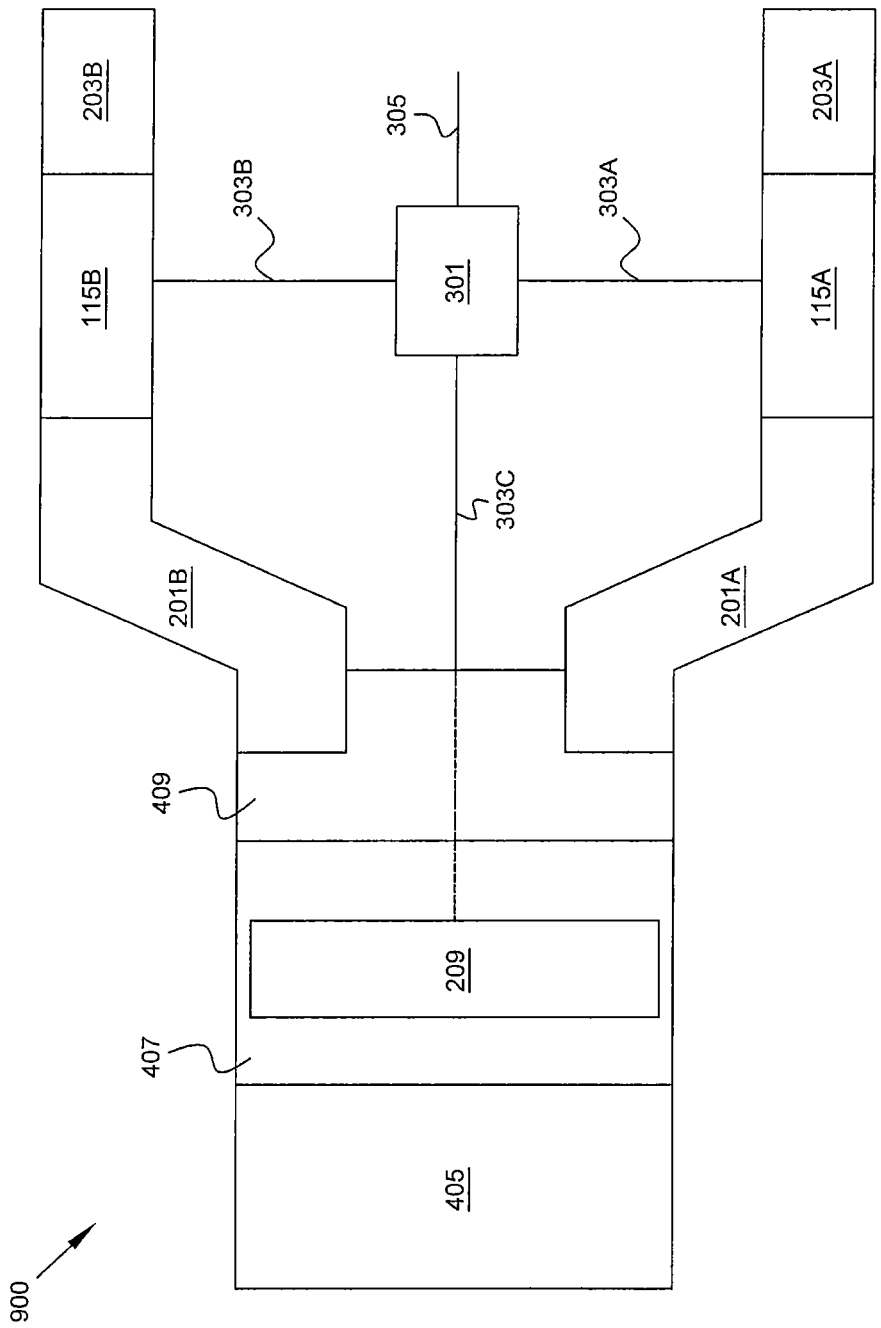
FIG. 9A is a detailed block diagram of an integrated propulsion system in accordance with some embodiments of the present disclosure.
Figure 9B:
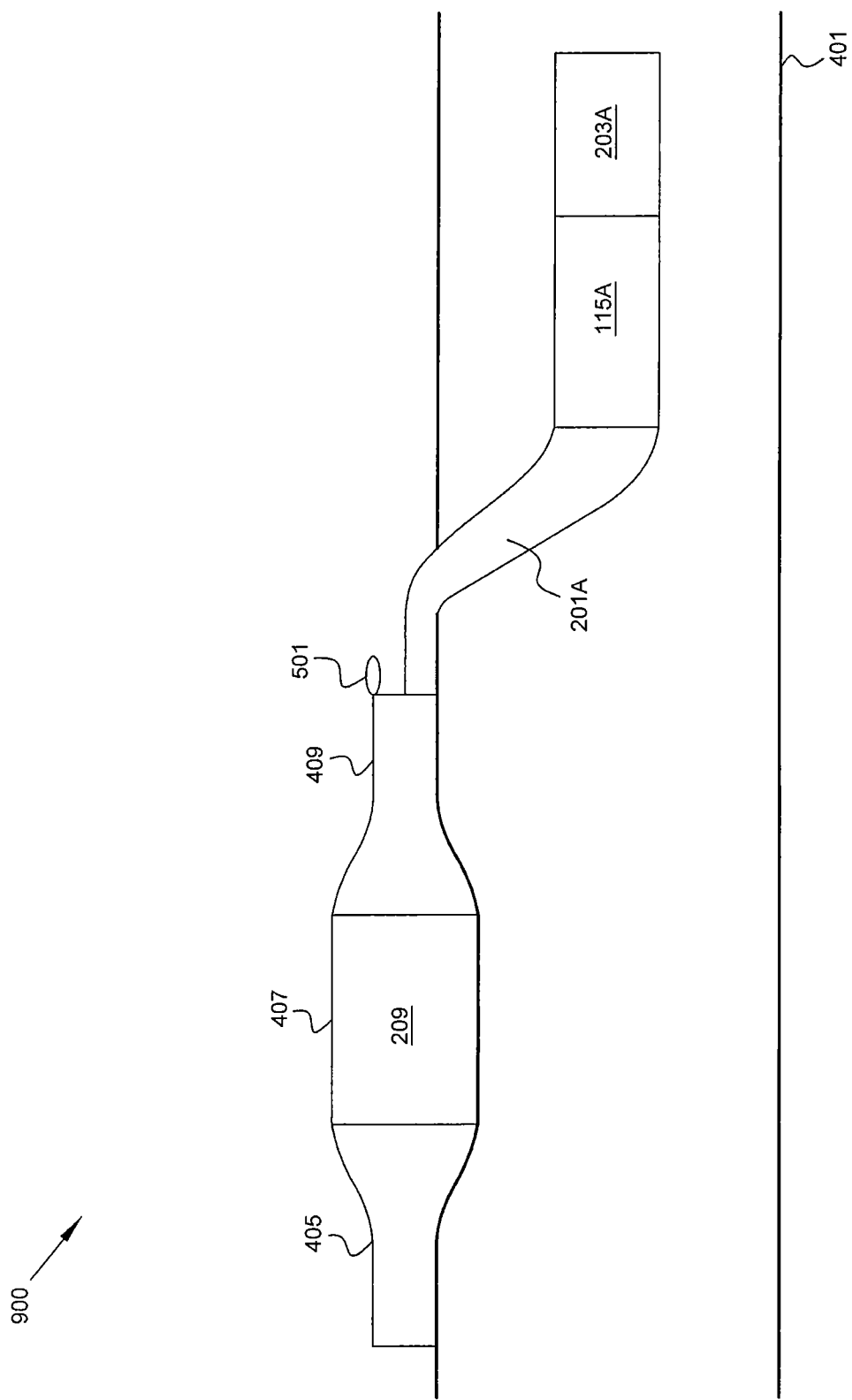
FIG. 9B is a side profile view of the main body of an aircraft having the integrated propulsion system of FIG. 9A, in accordance with some embodiments of the present disclosure.

An additional embodiment of an integrated propulsion system 900 is presented in FIGS. 9A and 9B. FIG. 9A is a detailed block diagram of an integrated propulsion system 900, while FIG. 9B is a side profile view of the main body of an aircraft 401 having integrated propulsion system 900.

Integrated propulsion system 900 comprises a fan 209, first engine core 115A, and second engine core 115B. Fan 209 is contained within a fan shroud 407 and is connected to a fan inlet duct 405 and fan exhaust duct 409. First engine core 115A is connected to a first engine inlet duct 201A and first engine exhaust duct 203A, while second engine core 115B is connected to a second engine inlet duct 203A and second engine exhaust duct 203B. As in the embodiment illustrated in FIGS. 3A and 3B, fan 209 is coupled to first engine core 115A and second engine core 115B via transmission shafts 303A, 303B, and 303C, and a gearbox 301. In some embodiments, an additional transmission shaft 305 is output from gearbox 301 to drive an alternative means of propulsion. In some embodiments a plurality of transmission shafts are referred to collectively as a transmission assembly.

In integrated propulsion system 900 first engine inlet duct 201A and second engine inlet duct 201B draw air from fan exhaust duct 409. Because only a portion of fan exhaust is needed to meet the air intake requirements of first engine core 115A and second engine core 115B, some fan exhaust is discharged from the fan exhaust duct 409 into the surrounding atmosphere.

The illustrated embodiment of FIGS. 9A and 9B enables first engine core 115A and second engine core 115B to draw inlet air at a higher pressure than atmospheric pressure, this configuration allows first engine core 115A and second engine core 115B to produce a higher power output and operate more efficiently. Thus this embodiment is more similar thermodynamically to a conventional turbofan engine than the embodiments of FIGS. 3A and 3B. Additionally, the integrated propulsion system 900 provides advantageous packaging of the system 900 within the main body 401 in some applications.

The disclosed integrated propulsion systems provide numerous advantages over the prior art. The disclosed system requires a smaller volumetric footprint within the airframe because it uses a single fan unit vice multiple fan units or multiple turbofans. In previous configurations which required the use of multiple fan units a significant amount of cargo space was used by the fan units, leading to the use of blended wing body airframes to accommodate the configuration. In contrast, the present disclosure is capable of use with a conventional aircraft body comprising a main body and laminar flow wings extending from the main body. The smaller volumetric footprint also allows for easier packaging within the aircraft, and as a result can lead to use in a smaller cross-sectioned aircraft. The disclosed system additionally has improved drag performance over prior configurations (i.e. reduced aircraft aerodynamic drag) because a single fan unit, even when relatively larger than a fan unit of multiple fan unit configurations, weighs less than multiple fan units and their associated ducting. A smaller cross-sectioned aircraft would also display improved drag performance over prior configurations. Finally, the use of a single, larger fan unit provides greater fuel efficiency than multiple fan configurations.

Although examples are illustrated and described herein, embodiments are nevertheless not limited to the details shown, since various modifications and structural changes may be made therein by those of ordinary skill within the scope and range of equivalents of the claims.

The invention claimed is:

1. An aircraft with an integrated propulsion system wherein a number of gas turbine engines and a number of fans consists of two gas turbine engines and one fan, the system comprising:
    a transmission assembly coupling a first of said two gas turbine engines and a second of said two gas turbine engine to said fan;
    a fan passage in fluid communication with the fan, the fan passage defined between a fan inlet duct and a fan exhaust duct; and
    at least one gas turbine engine passage in fluid communication with one of the two gas turbine engines, the at least one gas turbine engine passage defined between an inlet duct of the one gas turbine engine and an exhaust duct of the one gas turbine engine;
    wherein the fan passage and the at least one gas turbine engine passage are exclusive of one another; the fan passage and the at least one gas turbine engine passage being at least partially defined within a fuselage of the aircraft,
    wherein the inlet duct of the one gas turbine engine is on a first side of the fuselage, and the fan inlet duct is on a second side of the fuselage, wherein the second side of the fuselage is a top side or a bottom side of the fuselage, wherein the top side is the side of the fuselage on which a cockpit of the aircraft is located and the bottom side of the fuselage is the side of the fuselage opposite the top side.

2. The system of claim 1, wherein said first gas turbine engine, said second gas turbine engine, and said fan each have an exclusive air flow duct.

3. The system of claim 2, wherein the exclusive air flow duct of said fan comprises the fan inlet duct, the fan exhaust duct, and a thrust vectoring mechanism.

4. The system of claim 3, wherein the thrust vectoring mechanism is coupled to the fan exhaust duct, the thrust vectoring mechanism configured to vector an exhaust of the fan.

5. The system of claim 3, wherein each of said exclusive air flow ducts partially extend radially outward from a main body of the fuselage.

6. The system of claim 1 wherein said transmission assembly comprises a gearbox.

7. The system of claim 1 wherein said transmission assembly comprises a clutch.

8. The system of claim 1, wherein the fan passage and the at least one gas turbine engine passage each have a respective axis of rotation that can form an angle with a center axis of the fuselage.

9. The system of claim 1, wherein the transmission assembly is configured to distribute an output power of the first gas turbine engine and the second gas turbine engine to the fan.

10. An aircraft with a propulsion system comprising:
a first gas turbine engine installed on a first side of an aircraft body and a second gas turbine engine installed on a second side of said aircraft body; and
a fan unit installed on a top side of said aircraft body or a bottom side of the aircraft body, wherein the top side is the side of the aircraft body on which a cockpit of the aircraft is located and the bottom side is the side of the aircraft body opposite the top side, said fan unit coupled to said first gas turbine engine and said second gas turbine engine by a transmission assembly comprising a clutch and more than one rotating linkages,
wherein each of said first gas turbine engine and said second gas turbine engine are in fluid communication with a respective exclusive engine duct comprising an engine inlet duct and an engine exhaust duct, and wherein said fan unit is in fluid communication with an exclusive fan duct comprising a fan inlet duct and a fan exhaust duct, the exclusive fan duct and each of the exclusive engine ducts are at least partially defined within the aircraft body,
wherein the engine inlet duct of the first gas turbine engine is on the first side of the aircraft body, the engine inlet duct of the second gas turbine engine is on the second side of the aircraft body, and the fan inlet duct is on the top side of the aircraft body or the bottom side of the aircraft body.

11. The system of claim 10, wherein the fan inlet duct and the engine inlet duct of at least one of the first gas turbine engine or the second gas turbine engine are separated by the aircraft body.

12. The system of claim 10, wherein the exclusive fan duct defines a first airflow and each of the exclusive engine ducts define a second air flow and a third air flow, wherein said first airflow, said second air flow, and said third air flow are exclusive of each other.

13. The system of claim 10, wherein the fan inlet duct and the engine inlet duct of at least one of the first gas turbine engine or the second gas turbine engine opens to ambient air.

14. The system of claim 10, wherein the fan exhaust duct can be coupled with a thrust vectoring system.

15. The system of claim 10, wherein said fan unit, said first gas turbine engine, and said second gas turbine engine each have a respective axis of rotation that can form an angle with a center axis of the aircraft body.

* * * * *